United States Patent [19]

Buls et al.

[11] Patent Number: 5,236,014
[45] Date of Patent: Aug. 17, 1993

[54] TRIM FOR ANSI CLASS V SHUT OFF OF VALVES

[75] Inventors: Melvin L. Buls; Randy L. Hall, both of Marshalltown, Iowa

[73] Assignee: Fisher Controls International, Inc., Clayton, Mo.

[21] Appl. No.: 891,202

[22] Filed: Jun. 1, 1992

[51] Int. Cl.⁵ .......................... F16K 1/52; F16K 47/14
[52] U.S. Cl. ............... 137/625.3; 137/625.38; 251/175; 251/900
[58] Field of Search ............... 137/625.38, 625.3; 251/175, DIG. 1

[56] References Cited

U.S. PATENT DOCUMENTS 4,429,716 2/1984 Conrad .................. 137/625.38 X
4,722,507 2/1988 Lindackers et al. ....... 137/625.38 X Primary Examiner—Arnold Rosenthal
Attorney, Agent, or Firm—Marshall, O'Toole, Gerstein, Murray & Borun

[57] ABSTRACT

The disclosed valve provides a seal between the valve plug and the valve body to substantially prevent leakage therebetween when the valve is in its closed position. The seal can be arranged for minimizing the net forces acting on the valve plug to close the valve or to keep the valve closed; thus, the net result is a smaller valve actuator. Furthermore, the seal can be arranged to withstand high temperatures.

22 Claims, 6 Drawing Sheets

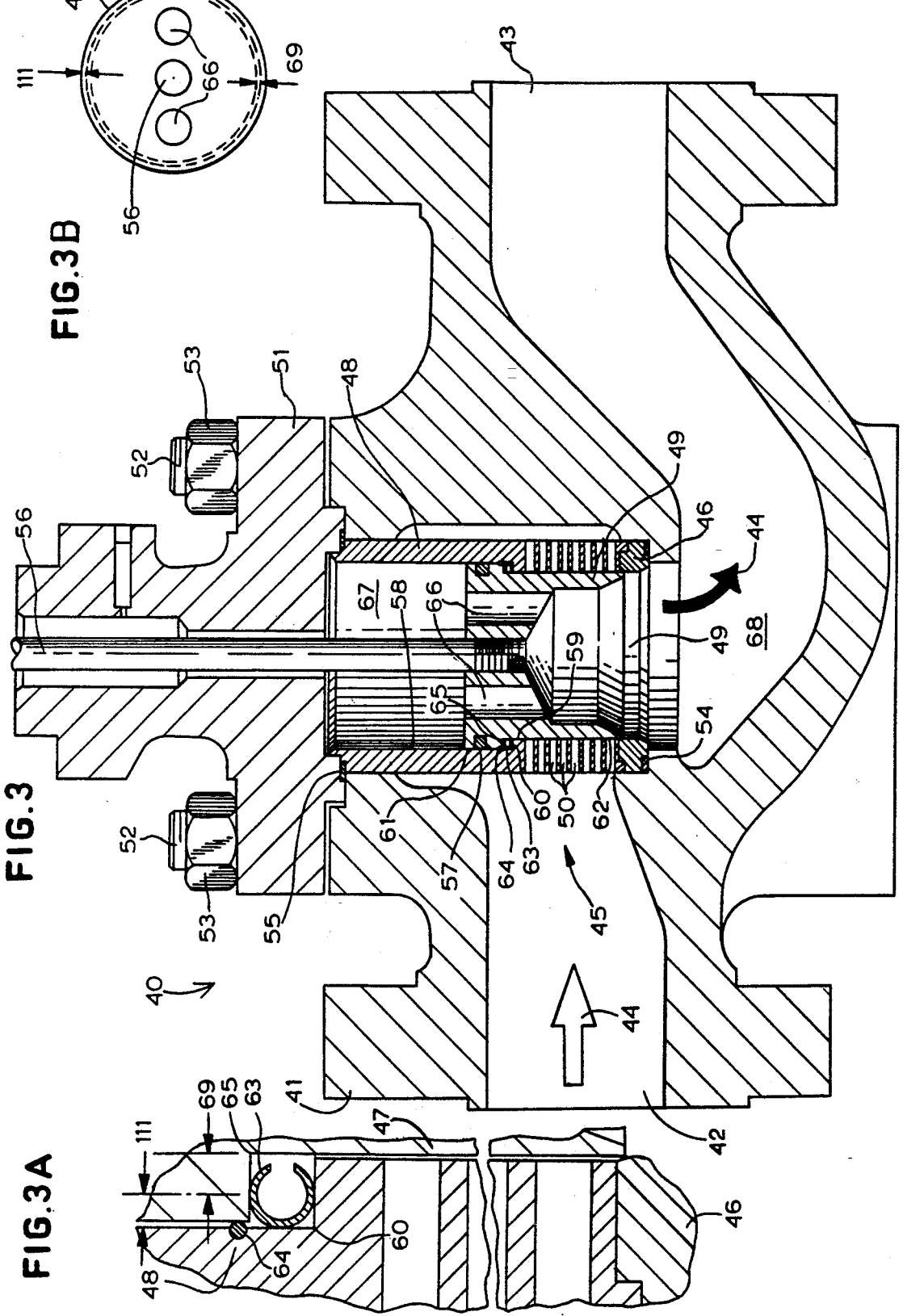

TRIM FOR ANSI CLASS V SHUT OFF OF VALVES

FIELD OF THE INVENTION

The present invention relates to a valve for controlling the flow of fluid between inlet and outlet ports and, more particularly, to a valve having a trim arrangement which will substantially prevent leakage above the maximum shut off leakage established by ANSI Leakage Class V even though the valve experiences temperatures in excess of 450° F. (about 232° C.).

BACKGROUND OF THE INVENTION

Standards exist which establish seat leakage classifications for control valves according to a valve's ability to shut off flow when it is closed. These standards specify the amount of flow allowed through the valve at shut off. This amount of flow is usually measured as a percentage of the rated valve capacity when a specified differential pressure is applied across the inlet and outlet ports of the valve. For example, ANSI standards provide that, for Leakage Class II, the maximum seat leakage through a valve shall not exceed 0.5% of its rated valve capacity at shut off. Similarly, Leakage Classes III and IV permit seat leakages of no more than 0.1% and 0.01%, respectively, of rated valve capacity to flow through the valve at shut off.

In order to determine whether or not a particular valve design meets the requirements of Leakage Classes II, III and IV, an air or water leakage test is performed on the valve while the valve is in its closed position. Typically, this air or water leakage test is performed by coupling an air or water supply to the inlet port of a closed valve and measuring the amount of leakage through the valve.

On the other hand, a valve which satisfies the requirements of Leakage Class V is tested using a water leakage test wherein a source of water is coupled to the inlet port of the valve and the amount of water flowing through the valve while it is in its closed position is measured. According to Leakage Class V, the maximum seat leakage through the valve is only 0.0005 milliliters of water per minute, per inch of port diameter, per psi differential pressure from inlet port to outlet port. As an example, if the valve has two inch diameter ports and the source of water connected to the inlet port is at 100 psi with respect to the pressure at the outlet port, then 0.1 milliliter of water is permitted to flow through the valve per minute when the valve is in its closed position. If the flow exceeds this amount, the valve does not meet the requirements of ANSI Leakage Class V.

In addition to meeting the requirements of the desired ANSI Leakage Class, it is also advantageous for the valve to have a balanced valve plug. A balanced valve plug is one having substantially equal areas against which the internal fluid pressures of the valve act so that the net forces acting on the valve plug as a result of these pressures will be minimized. By minimizing these net forces, the size of the actuator necessary to overcome these net forces and move the valve plug is also minimized.

A prior art double port valve such as shown in FIG. 1 is often used to balance the net forces acting on the valve plug to thereby minimize the actuator force necessary to position the plug. The double port valve shown in FIG. 1 has a valve plug 11 carrying two lands 12 and 13. The land 12 cooperates with a seat ring 14 at the upper port and the land 13 cooperates with a seat ring 15 at the lower port to control the flow of fluid from an inlet 16 to an outlet 17.

The surface areas of the lands 12 and 13 cannot be made exactly equal because, when the plug 11 is inserted through the top of the valve during valve assembly, the land 13 must be small enough that it can pass through the seat ring 14. On the other hand, the land 12 must be larger than land 13 so that land 12 does not pass through the seat ring 14 but instead seats against seat ring 14. Thus, the land 12 is larger than the land 13.

Because the area of the land 12 is larger than the land 13, the fluid pressure from the inlet 16 near or at shut off will exert a greater force on the land 12 than on the land 13. The resulting net force is in a direction to oppose closing of the valve. This net force must be overcome by the actuator in order to close the valve.

The surface areas of the lands 12 and 13 are, however, nearly equal so that the net force exerted on the valve plug 11 is small. However, because it is very difficult to machine the lands and seat rings to the tight tolerances necessary to prevent leakage at shut off and to maintain thermal expansion differences at a minimum, it is consequently very difficult to manufacture this double port valve so that it will meet the maximum leakage requirements of Leakage Class V, especially at high operating temperatures.

Shown in FIG. 2 is a prior art double seat valve which is designed to meet the leakage requirements of Leakage Class V and to minimize the size of the valve's actuator. The valve shown in FIG. 2 has a valve plug 21 positioned by a valve stem 22 which enters the valve through a typical bonnet 23 and a valve packing 24. The valve plug 21 has a two part construction which includes a pilot plug 25 and a primary plug 26. The primary plug 26 cooperates both with openings 27 in a cage 28 and with a lower valve seat in the form of a seat ring 31 to control the flow of fluid between valve ports 29 and 30. The primary plug 26 is moved away from the seat ring 31 by virtue of a washer 32 attached to the end of the pilot plug 25 by a nut 33 and is moved toward the seat ring 31 by virtue of a plurality of springs only two of which, springs 37 and 38, are shown.

The pilot plug 25 has openings 35 and 36 therein so that the fluid pressures above and below the pilot plug 25 will be equal. Thus, when the valve is to be opened, the forces acting on the pilot plug 25 caused by fluid pressure on both of its sides are relatively balanced. The valve stem 22 lifts the pilot plug 25 away from an upper valve seat 34 formed in the primary plug 26 to allow the pressure on both sides of the primary plug 26 to equalize through openings 39 in the primary plug 26.

When the valve is to be closed, the valve stem 22 drives the primary plug 26 in a direction so that it will seat against the seat ring 31. The springs 37 and 38 exert a force between the pilot plug 25 and the primary valve plug 26 to keep the port between the pilot plug 25 and the upper valve seat 34 open to maintain the pressures across the primary plug 26 balanced until the primary plug 26 is seated against the lower valve seat 31. When the primary plug 26 is seated against the lower valve seat 31, the valve stem 22 will cause the pilot plug 25 to seat against the upper valve seat 34 completing closure of the valve.

Thus, the force necessary to move the primary plug 26 to, and away from, the seat ring 31 is minimized, and minimum actuator size is needed to open and/or close the valve of FIG. 2. This double seat arrangement allows the valve to achieve Leakage Class V shut off. However, the valve construction shown in FIG. 2 is complicated, requires a plurality of springs, and contains numerous parts which require tight machining tolerances.

SUMMARY OF THE INVENTION

In the valve according to the present invention, a trim arrangement is provided in the valve to prevent leakage through the valve above the maximum shutoff leakage established by ANSI Leakage Class V. This trim arrangement reduces the unbalanced forces which act on the valve. Furthermore, this trim arrangement also can withstand temperatures of about 450° F. (about 232° C.) and above so that the valve can be used in those high temperature applications which require leakage Class V shut off.

Accordingly, the valve in one aspect of the invention includes a valve body having inlet and outlet ports, a valve stem extending through the valve body, and a trim arrangement within the valve for controlling the flow of fluid between the inlet and outlet ports. This trim arrangement includes a valve plug, attached to the valve stem, and a valve seat. The valve plug prevents fluid flow between the inlet and outlet ports when the valve plug is positioned by the valve stem against the valve seat and allows fluid flow between the inlet and outlet ports when the valve plug is positioned by the valve stem away from the valve seat. The valve plug has an opening therethrough for equalizing pressures across the valve plug when the valve plug is positioned against the valve seat. This trim arrangement further includes a seal around the valve plug. The seal is arranged to prevent fluid leakage through the valve above the maximum leakage allowed by ANSI Leakage Class V.

This seal may be a C-ring, a V-ring or an S-ring. A valve cage may also be included within the valve and has first and second cage perimeters to form a cage ledge. The seal may be captured at the cage ledge by a retainer. Alternatively, the valve plug can be provided with first and second plug perimeters forming a plug ledge so that the seal can be captured at the plug ledge by a retainer. In a still further alternative, the valve plug may have first, second and third plug perimeters forming a recess in which the seal may be located. In yet a still further alternative, the valve plug can include two plug parts for clamping the seal therebetween.

The valve in another aspect of the invention includes a valve body having inlet and outlet ports, a valve stem extending through the valve body, and a trim arrangement for controlling the flow of fluid between the inlet and outlet ports. The trim arrangement includes a valve cage having a cage opening therein, a lower valve seat, and a valve plug attached to the valve stem. The valve plug prevents fluid flow between the inlet and outlet ports through the cage opening when the valve plug is positioned by the valve stem against the valve seat and allows fluid flow between the inlet and outlet ports through the cage opening when the valve plug is positioned by the valve stem away from the valve seat. The valve plug also has an opening therethrough for equalizing pressure across the valve plug when the valve plug is positioned against the valve seat. The trim arrangement also includes an upper valve seat, formed by either the valve plug or the valve cage, and a seal around the valve plug. The seal cooperates with the upper valve seat to prevent fluid leakage through the valve above the maximum leakage allowed by ANSI Leakage Class V when the valve is closed.

The trim arrangement including the seal can comprise a material, such as metal, for withstanding temperatures of about 450° F. (about 232° C.) or higher. The high temperature seal may be a C-ring, a V-ring or an S-ring. The mechanical spring force of these types of seals compensates for the machining tolerances and dimensional variations caused by temperature changes.

The valve in yet another aspect of the invention includes a valve body having inlet and outlet ports, a valve stem extending through the valve body, and a trim arrangement for controlling the flow of fluid between the inlet and outlet ports. The trim arrangement includes a valve cage having a cage opening therein and an inner surface area. The inner surface area has a slope forming an upper valve seat. The trim arrangement further includes a lower valve seat and a valve plug attached to the valve stem. The valve plug prevents fluid flow between the inlet and outlet ports through the cage opening when the valve plug is positioned by the valve stem against the lower valve seat and allows fluid flow between the inlet and outlet ports through the cage opening when the valve plug is positioned by the valve stem away from the lower valve seat. The valve plug has an opening therethrough for equalizing pressure across the valve plug when the valve plug is positioned against the valve seat. The trim arrangement further includes a seal around the valve plug which cooperates with the upper valve seat to prevent fluid leakage through the valve when the valve is closed. The seal may be in the form of a ring having a ring opening oriented in the direction of travel of the valve stem and valve plug. A retainer may be included to retain the seal to the valve plug.

BRIEF DESCRIPTIONS OF THE DRAWINGS

These and other features and advantages will become more apparent from a detailed consideration of the invention when taken in conjunction with the drawings in which:

FIG. 3 is cross-sectional view of a valve and a trim arrangement having a C-ring seal according to one aspect of the invention;

FIG. 3A is an enlarged cross-sectional view of a part of the trim arrangement shown in FIG. 3;

FIG. 3B is a top view of the valve plug shown in FIGS. 3 and 3A, and illustrates that the unbalance area of the valve is annular;

DETAILED DESCRIPTION

Figure 1:
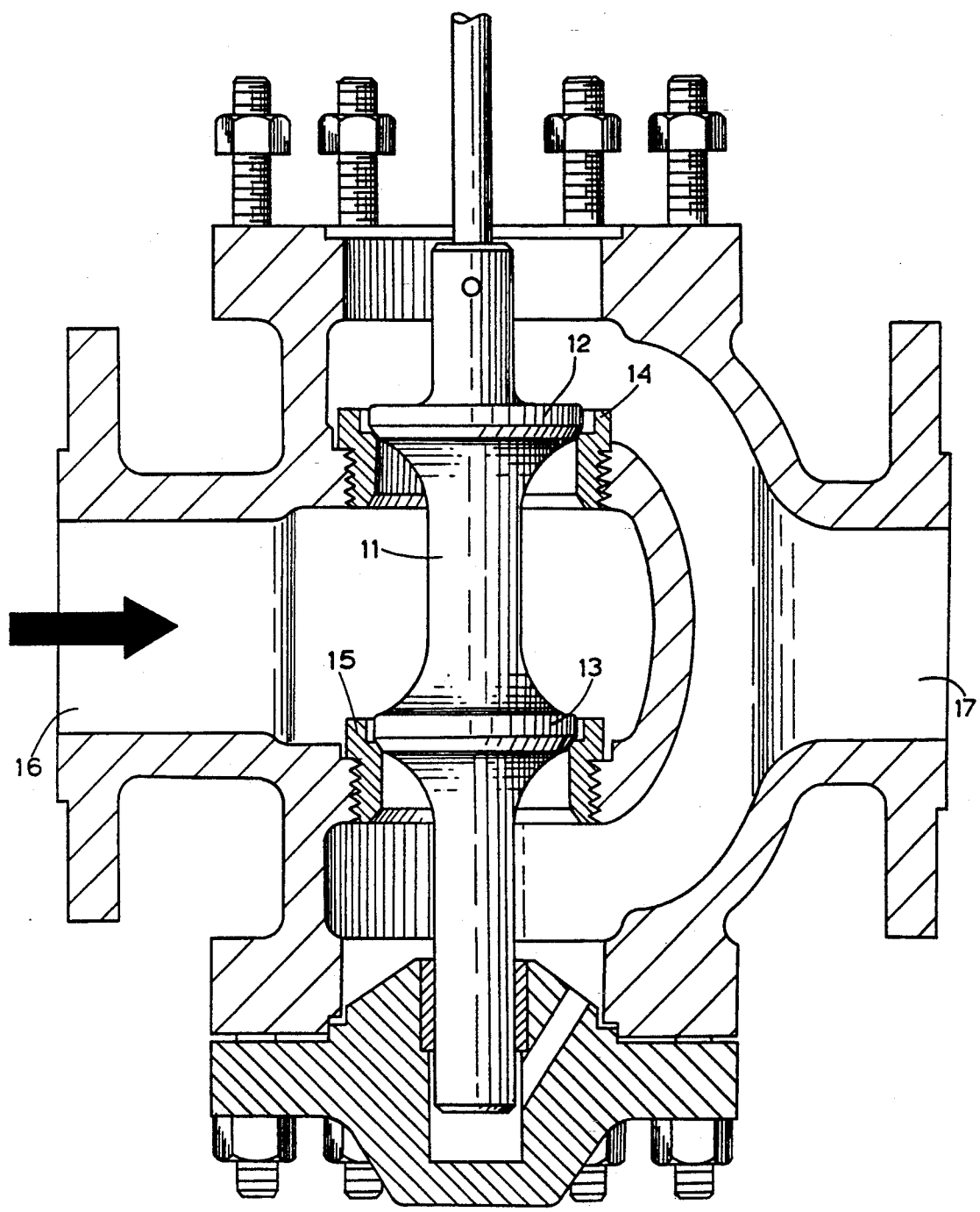
FIG. 1 is a cross-sectional view of a prior art double port valve.
Figure 2:
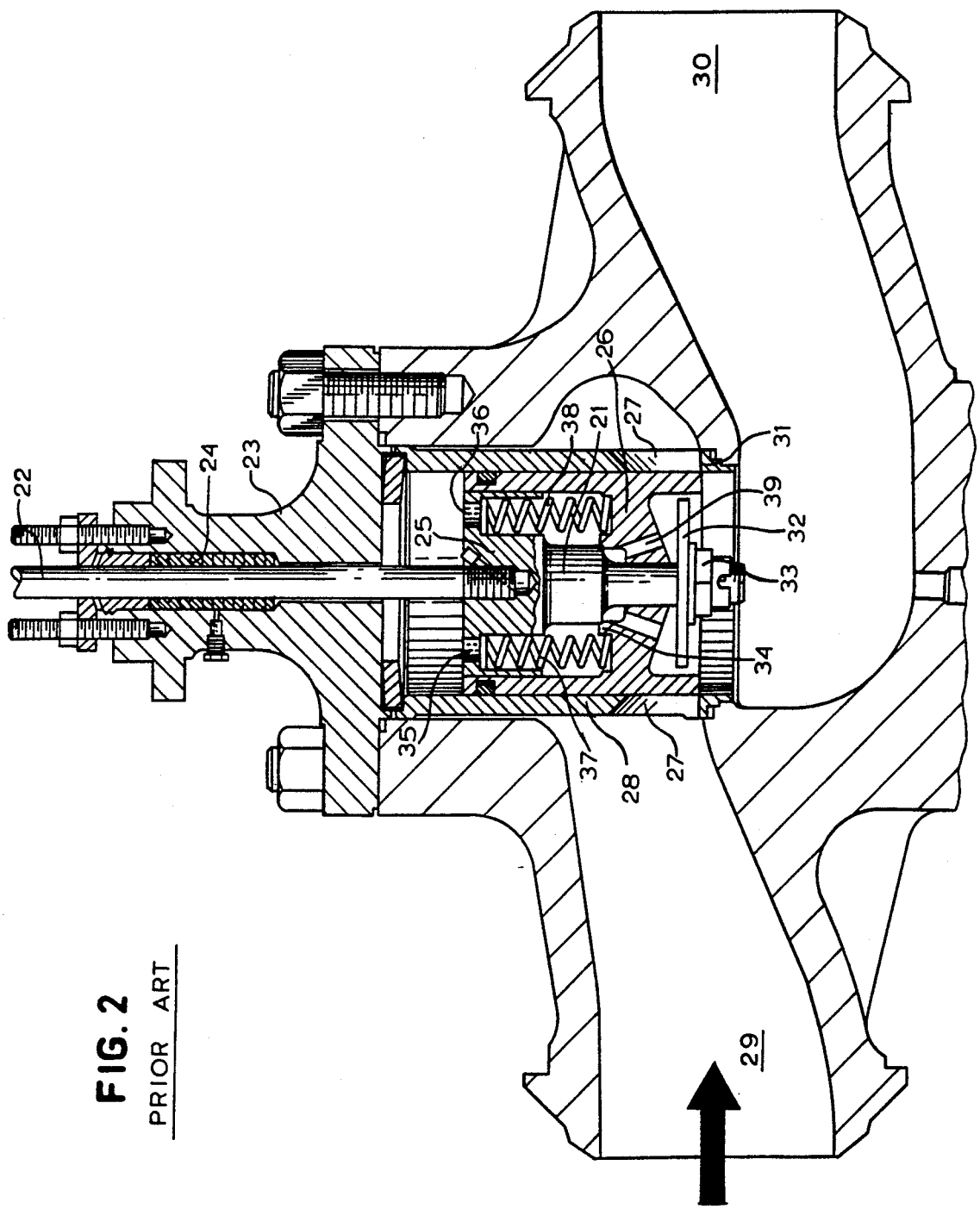
FIG. 2 is a cross-sectional view of a prior art double seat valve.

As shown in FIG. 3, a valve 40 includes a valve body 41 having ports 42 and 43 either of which may be designated as an inlet port and the other of which may be designated as an outlet port depending upon the direction of flow through the valve. For the flow direction shown by arrows 44 in FIG. 3, the port 42 is the inlet port and the port 43 is the outlet port. A trim arrangement 45 controls the flow of fluid between the ports 42 and 43. The trim arrangement 45 includes a valve plug 47, a valve cage 48, and a lower valve seat in the form of a seat ring 46. The seat ring 46 has an opening 49 and the valve cage 48 has a plurality of openings 50 through which fluid can flow when the valve is in its open position.

A bonnet 51 is affixed t o the valve body 41 by suitable means such as bolts 52 and nuts 53. A gasket 54 is located between the valve body 41 and the seat ring 46 and a gasket 55 is located between the bonnet 51 and both the valve cage 48 and the valve body 41. When the bonnet 51 is affixed to the valve body 41, the bonnet 51 compresses the gasket 55 between the bonnet 51 and both the valve body 41 and the cage 48 and also compresses the gasket 54 between the seat ring 46 and the valve body 41 in order to contain fluid within the valve body 41. The bonnet 51 also compresses the cage 48 against the seat ring 46 for retaining the seat ring 46 within the valve body 41.

A valve stem 56 extends through the bonnet 51 and into the valve body 41. Conventional valve packing and seals (not shown) may be provided around the valve stem 56. Affixed to the valve stem 56, such as by suitable threads, is the valve plug 47 which cooperates with the seat ring 46 for controlling the flow of fluid through the valve 40. As shown in FIG. 3, when the valve plug 47 is closed, the valve plug 47 seats against the seat ring 46, covers the openings 50 through the cage 48, and closes on a C-ring 63 (to be further described hereinbelow) in order to shut off the flow of fluid from the port 42 to the port 43. When the valve plug 47 is open, the valve plug 47 is withdrawn from the seat ring 46 by the valve stem 56 and fluid is allowed to flow from the port 42, through the openings 50 in the cage 48, through the opening 49 in the seat ring 46, and to the port 43. The valve plug 47 may include a conventional piston ring 57 to minimize leakage between the cage 48 and the valve plug 47 while the valve plug 47 is throttling flow through the valve 40.

The cage 48 has a first cage perimeter 58 and a second cage perimeter 59 forming a cage ledge 60. The valve plug 47 has a first plug perimeter 61 substantially commensurate with the first cage perimeter 58 and a second plug perimeter 62 substantially commensurate with the second cage perimeter 59. The difference between the first plug perimeter 61 and the second plug perimeter 62 forms a plug ledge or upper valve seat 65. Thus, when the valve 40 is closed, the lower portion of the valve plug 47 seats against the lower valve seat in the form of the seat ring 46 and the C-ring seal 63 is pressed against the upper valve seat 65 and the cage ledge 60 in order to shut off flow through the valve 40. The C-ring seal 63 is held against the cage ledge 60 by a retainer 64. The retainer 64, which may be a wire snap ring, will maintain the C-ring seal 63 against the cage ledge 60 as the valve plug 47 is stroked by the valve stem 56. Accordingly, the C-ring seal 63 remains substantially stationary as the valve plug 47 travels. It is to be noted that the C-ring seal 63 is in compression only when the valve plug 47 is in its closed position. As a result, wear on the C-ring seal 63 and on the upper valve seat 65 is minimized or prevented.

The orientation of the C-ring seal 63 shown in FIG. 3 accommodates flow through the valve 40 from the port 42 to the port 43. The C-ring seal 63 provides a substantially fluid tight seal between the valve plug 47 and the cage 48 when the valve plug 47 is positioned against the seat ring 46. That is, when the valve 40 is closed so that the valve plug 47 is positioned against the seat ring 46, the C-ring seal 63 provides a seal against any leakage through the valve 40 between the valve plug 47 and the cage 48. Any fluid attempting to leak through the valve 40 between the valve plug 47 and the cage 48 will enter the opening of the C-ring seal 63 and press the C-ring seal 63 more tightly against the upper valve seat 65 and the cage ledge 60 to increase the seal between the valve plug 47 and the cage 48. The mechanical spring force of the C-ring seal 63 compensates for the machining tolerances and dimensional variations caused by temperature changes.

The valve plug 47 has openings 66 in order to balance the pressures acting across it. Thus, because of the openings 66, the pressures in volume 67 above the valve plug 47 and in volume 68 below the valve plug 47 will be equal and would result in generally equal but opposite internal fluid forces being applied to the valve plug 47 except for the unbalance area of the valve plug 47. This unbalanced area can best be seen from FIG. 3A.

FIG. 3A is an enlarged cross-sectional view of that part of the trim arrangement 45 which includes the C-ring seal 63, the upper valve seat 65, and the lower valve seat provided by the seat ring 46. The dimensions of FIG. 3A are exaggerated for clarity. As shown in FIG. 3A, when the valve 40 is closed, the lower portion of the valve plug 47 is seated against the seat ring 46 and the C-ring seal 63 is pressed against the upper valve seat 65. However, because of the openings 66 through the valve plug 47, outlet pressure is applied against both the upper and lower sides of the valve plug 47. These upper and lower sides have generally equal areas except for the area of the valve stem which can be minimized but must be present. Since the pressures in the volumes 67 and 68 are thus equal and act against generally equal areas, these pressures will exert generally equal but opposite forces on the valve plug 47. These generally equal but opposite forces will offset one another. However, there will be an area of the valve plug 47 which will be exposed to different pressures resulting in non-offsetting forces being applied to the valve plug 47. This area is unbalance area 69 and, as best shown in FIG. 3B, is annular.

This unbalance area 69 has an outer radius defined by the point at which the C-ring seal 63 contacts the upper valve seat 65 and an inner radius defined by the point at which the lower portion of the valve plug 47 contacts the seat ring 46. (The annular area 111 of the valve plug 47 between the annular area 69 and the point of contact between the piston ring 57 and the first cage perimeter 58 does not contribute to the unbalance area. The pressure above the valve plug 47 exerts a downward force against the area 111. This pressure also leaks down passed piston ring 57 to the are between ledges 60 and 65 outside the C-ring seal 63 and exerts an upward force upon the area 111 of the plug 47 to counter the downward force.) The lower side of this unbalance area 69 is exposed to inlet pressure because of the leakage between valve plug 47 and cage 48 which will fill the C-ring seal 63. The upper side of this unbalance area, at the top of the valve plug 47, is exposed to the outlet pressure in the volume 67. If these pressures are different, as they will most often be, a resulting net force will be applied to the valve plug 47 which must be overcome by the valve actuator when the valve is to be closed. This net force is proportional to the difference between these pressures multiplied by the unbalance area. As can be seen from FIGS. 3 and 3A, because the size of this unbalance area is small, the net force acting on the valve plug 47 due to this unbalance area is also small so that a smaller actuator is required to close the valve plug 47 against the seat ring 46 than would be the case with prior art valves. This trim arrangement allows Leakage Class V shut off when the valve plug 47 is positioned against the seat ring 46. Furthermore, the C-ring seal 63 may be made of a suitable material, such as Inconel X750 or 718 metal, so that the valve 40 can withstand high temperatures, such as those in the neighborhood of 450° F. (about 232° C.) and above. (It is also necessary, of course, to suitably select materials for the other parts of valve 40.)

Figure 4:
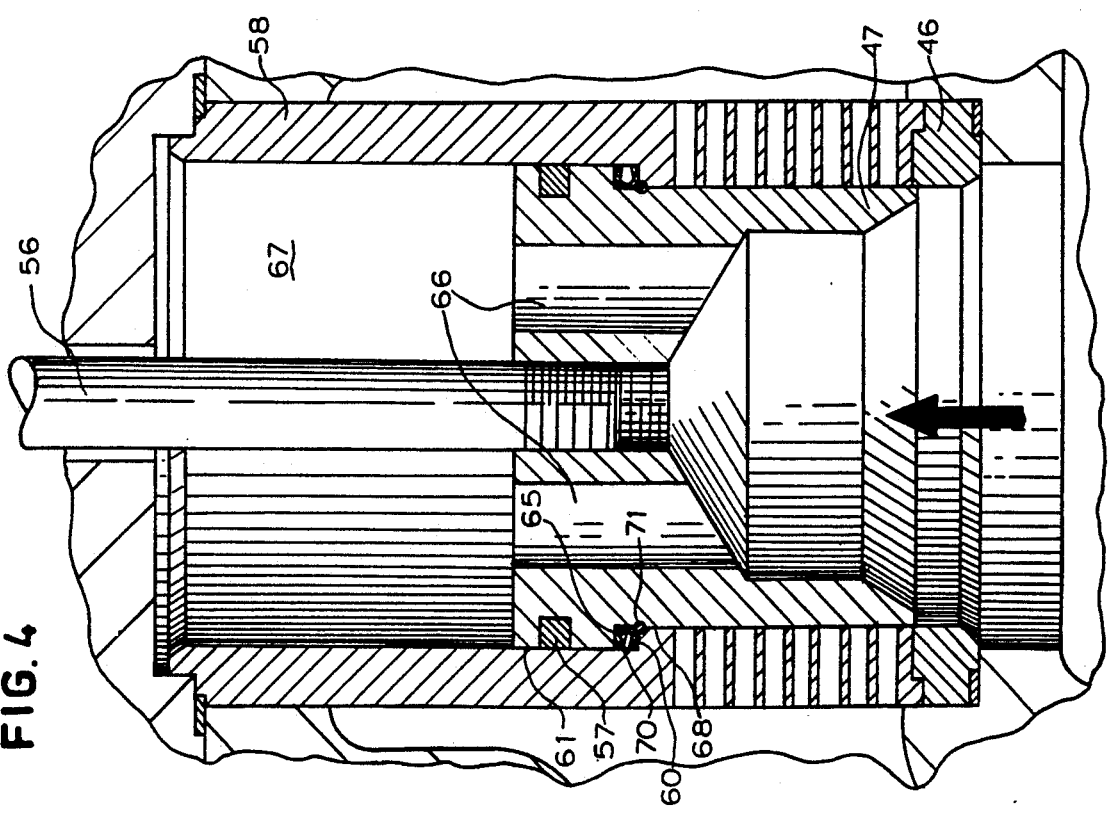
FIG. 4 shows the trim arrangement of FIG. 3 except that the C-ring has an orientation in order to accommodate flow through the valve in an opposite direction.

The trim arrangement of FIG. 3 is shown in FIG. 4 (wherein like reference numerals are used to depict like elements) except for the orientation and retaining of the C-ring seal. Accordingly, the C-ring seal 70 of FIG. 4 has an orientation to accommodate flow in the direction of the arrow, i.e. in the opposite direction through the valve 40. As shown in FIG. 4, the C-ring seal 70 has its opening directed in the opposite direction to the opening of the C-ring seal 63 shown in FIG. 3. In the case of FIG. 4, any fluid attempting to leak through the valve 40 when it is closed will tend to flow between the valve plug 47 and the cage 48 (with this flow direction, the cage ledge 60 now becomes the upper valve seat) from the volume 67 to the port 42. This fluid will fill the C-ring seal 70 through its outwardly directed opening and will press the C-ring seal 70 more tightly against the cage ledge 60 of the cage 48 and the plug ledge 65 thus increasing the seal between the valve plug 47 and the cage 48. With the trim arrangement of FIG. 4, the unbalance area is defined as the area of the valve plug 47 between the point where the C-ring seal 70 contacts the upper valve seat (i.e. the cage ledge 60 for the flow direction shown in FIG. 4) and the point where the lower portion of the valve plug 47 contacts the seat ring 46. This trim arrangement also allows the valve to achieve Leakage Class V shut off at high temperatures.

Moreover, whereas the retainer 64 retains the C-ring seal 63 against the cage ledge 60 in FIG. 3 so that the C-ring seal 63 does not move with the valve plug 47, the retainer 71 of FIG. 4 retains the C-ring seal 70 to the valve plug 47. Accordingly, the C-ring seal 70 moves with the valve plug 47.

Figure 5:
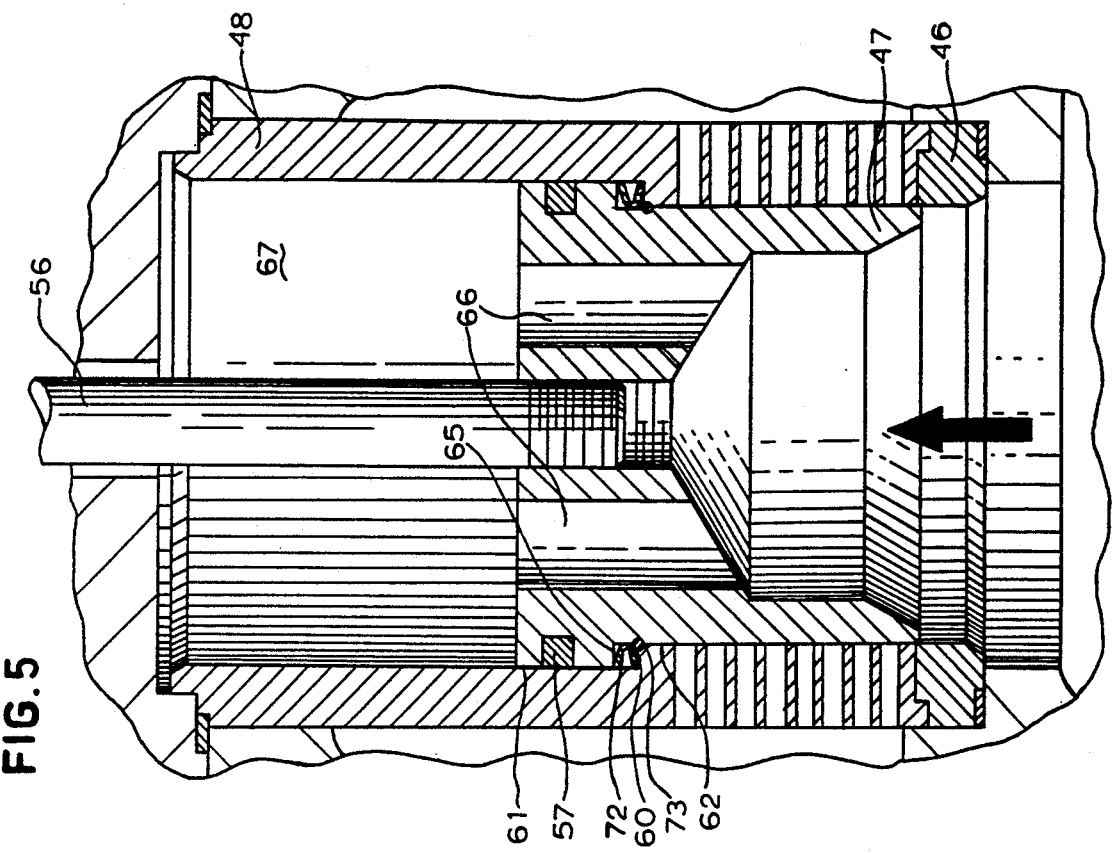
FIG. 5 shows a trim arrangement having a V-ring seal instead of the C-ring seal shown in FIGS. 3 and 4.

The trim arrangement of FIG. 4 is shown in FIG. 5 (with like reference numerals used for like elements) except that, instead of the C-ring seal 70 of FIG. 4, a V-ring seal 72 is provided in the arrangement of FIG. 5. The V-ring seal 72 is held to the valve plug 47 by a retainer 73. Although the arrangement shown in FIG. 5 accommodates flow through the valve 40 from the port 43 to the port 42 (in the direction of the arrow), it should be apparent that flow from the port 42 to the port 43 can also be accommodated by reversing the orientation of the V-ring seal 72 shown in FIG. 5 so that the opening of the V-ring seal 72 points inwardly instead of outwardly. Furthermore, as in the case of the C-ring seals shown in FIGS. 3 and 4, the V-ring seal 72 may be made of a suitable metal so that the valve 40 can operate in high temperature environments with Leakage Class V shut off.

Figure 6:
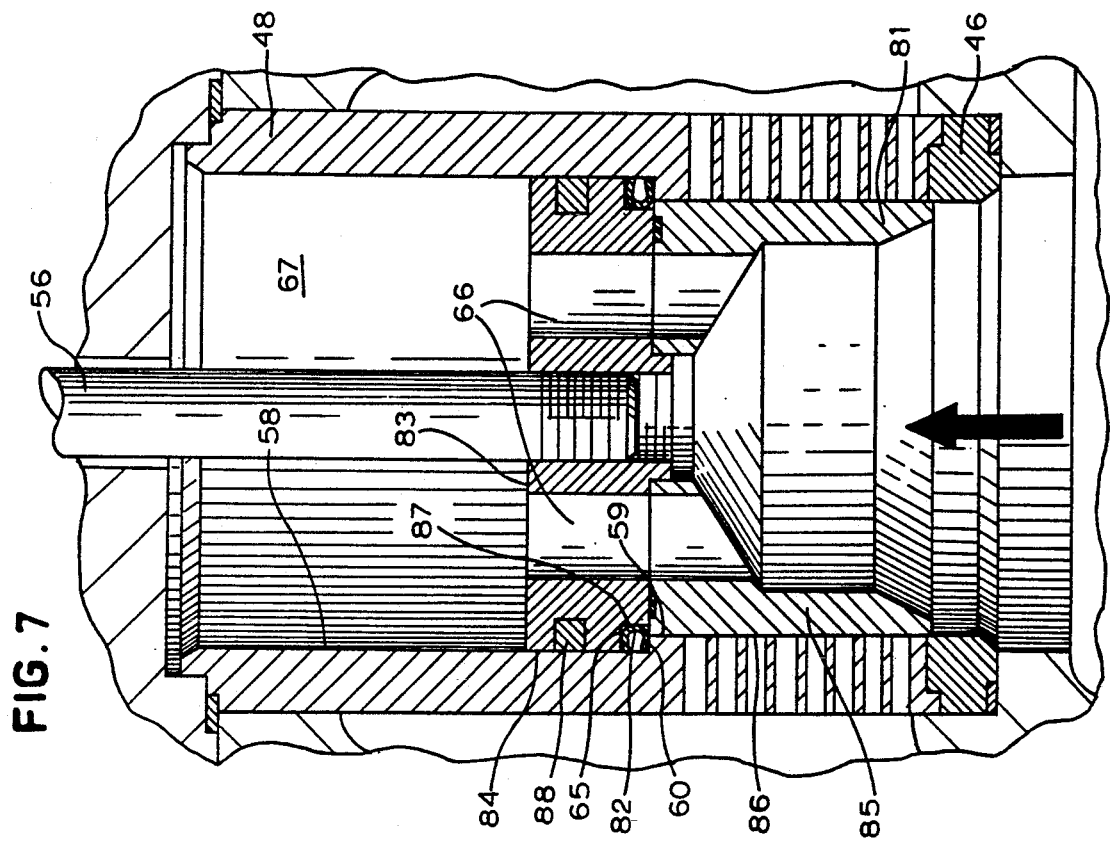
FIG. 6 shows a trim arrangement having an S-ring seal instead of the C-ring seals shown in FIGS. 3 and 4 or the V-ring seal shown in FIG. 5.

The trim arrangement shown in FIG. 6 is similar to the trim arrangement of FIG. 3 (like reference numerals being used to depict like elements). However, as shown in FIG. 6, an S-ring seal 74 is used instead of the C-ring seal 63 shown in FIG. 3. In FIG. 6, the valve plug 75 has a two-part construction. Accordingly, a first plug part 76 and a second plug part 77 are suitably attached (such as by threads) to the valve stem 56. The first plug part 76 of the valve plug 75 has a first plug perimeter 78 commensurate with the first cage perimeter 58 of the cage 48. Similarly, the second plug part 77 of the valve plug 75 has a second plug perimeter 79 commensurate with the second cage perimeter 59. The S-ring seal 74 is clamped between the first plug part 76 and the second plug part 77 of the valve plug 75 so that the S-ring seal 74 will travel along with the valve plug 75 when the valve plug 75 is stroked by the valve stem 56.

The trim arrangement shown in FIG. 6 will accommodate flow (in the direction of the arrow) from the port 43 to the port 42 of the valve 40 shown in FIG. 3. Any fluid tending to leak between the valve plug 75 and the cage 48 will force S-ring 74 more tightly against the cage ledge 60 in order to increase the seal against such leakage. Accordingly, the design shown in FIG. 6 can also attain Leakage Class V shut off. Furthermore, as in the case of the C-ring seals shown in FIGS. 3 and 4 and the V-ring seal shown in FIG. 5, the S-ring seal 74 may be made of a suitable metal to allow the valve 40 to operate in high temperature environments. A conventional piston ring 80 may be included in the first plug part 76 of the valve plug 75 to minimize leakage between the cage 48 and the valve plug 75 while the valve plug 75 is throttling flow through the valve.

Figure 7:
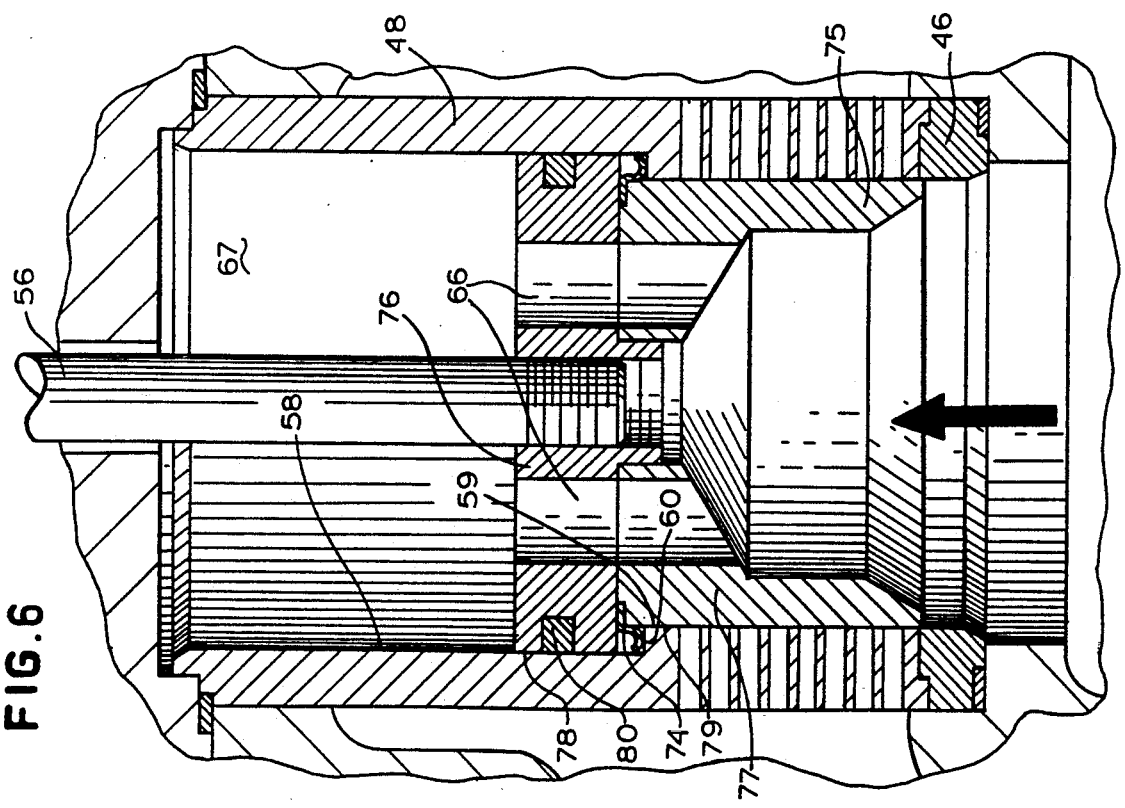
FIG. 7 shows an alternative trim arrangement for retaining a C-ring seal.

The trim arrangement shown in FIG. 7 is similar to, and can be used in place of, the trim arrangement 45 of FIG. 3 (like reference numerals being used to depict like elements). However, as shown in FIG. 7, the valve plug 81 has a two part plug construction in order to form a recess within which the C-ring seal 82 may be retained. Thus, a first plug part 83 of the valve plug 81 has a first plug perimeter 84 commensurate with the inner cage perimeter 58 and a second plug part 85 of the valve plug 81 has a second plug perimeter 86 commensurate with the inner cage perimeter 59. The first plug part 83 of the valve plug 81 also has a third plug perimeter 87. The third plug perimeter 87 is smaller than either the first plug perimeter 84 or the second plug perimeter 86 in order to form a recess within which to retain the C-ring seal 82. Thus, a wire snap ring or other suitable retainer is not necessary for retaining the C-ring seal 82.

The trim arrangement shown in FIG. 7, like the trim arrangement of FIG. 4, will accommodate flow (in the direction of the arrow) from the port 43 to the port 42 of the valve 40. Flow from the port 42 to the port 43 can be accommodated by reversing the orientation of the C-ring seal 82. As shown in FIG. 7, any fluid tending to leak between the valve plug 81 and the cage 48 will press the C-ring seal 82 more tightly against the cage ledge 60 and the plug ledge 65 in order to increase the seal against such leakage. Accordingly, the design shown in FIG. 7 can also attain Leakage Class V shut off. Furthermore, as in the case of the C-ring seals shown in FIGS. 3 and 4, the V-ring seal shown in FIG. 5, and the S-ring seal of FIG. 6, the C-ring seal 82 may be made of a suitable metal so that valve 40 can operate in high temperature environments. A conventional piston ring 88 may be included in the first plug part 83 of the valve plug 81 to minimize leakage between the cage 48 and the valve plug 81 while the valve plug 81 is throttling flow through the valve.

The unbalance areas of the valve plugs shown in FIGS. 5, 6 and 7 may be defined in the same manner as the unbalance areas of the valve plugs 47 shown in FIGS. 3, 3A and 3B were defined.

Figure 8:
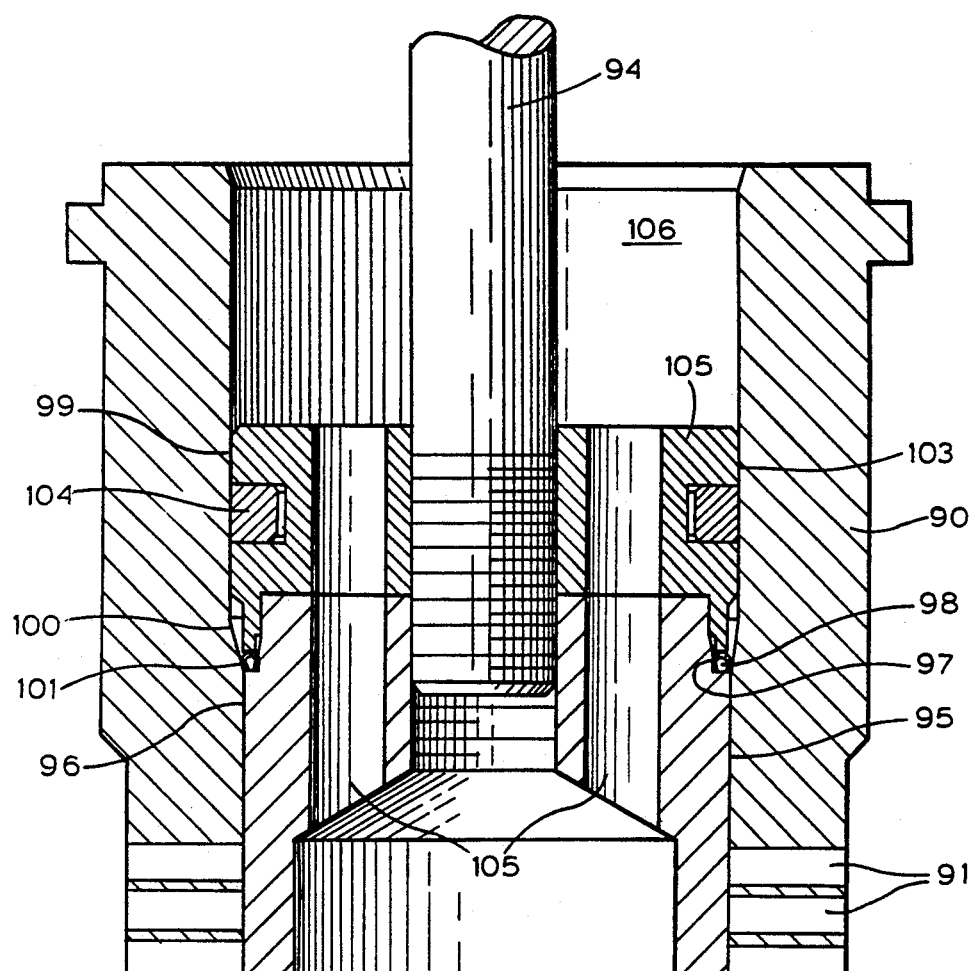
FIGS. 8 and 8A show an alternative trim arrangement having a C-ring seal arranged to further minimize the unbalance area of the valve.

The trim arrangement shown in FIG. 8 can be used in the valve 40 in place of the trim arrangement shown in FIG. 3. The trim arrangement of FIG. 8, however, further reduces the unbalance area of the valve plug. The trim arrangement of FIG. 8 includes a valve cage 90, a valve plug 92, a C-ring seal 101, a seal retainer 102, and a lower valve seat 93 in the form of a seat ring. The valve cage 90 of FIG. 8 has openings 91 to allow fluid to flow between the inlet and outlet ports of the valve 40 when the valve plug 92 is withdrawn from the lower valve seat 93. A valve stem 94 positions the valve plug 92 with respect to the lower valve seat 93 in order to control the flow of fluid through the valve. The valve plug 92 may be suitably attached to the valve stem 94 such as by threads.

The valve plug 92 has a first plug perimeter 95 substantially commensurate with a first cage perimeter 96 and a second plug perimeter 97 which is smaller than the first plug perimeter 95 to form a groove 98 between the valve plug 92 and the cage 90.

The cage 90 has a second cage perimeter 99. The inner surface of the cage 90 has a slope 100 to accommodate the difference between the first cage perimeter 96 and the somewhat larger second cage perimeter 99. The slope 100 forms an upper valve seat for the valve. The C-ring seal 101 is located within the groove 98 and has its opening either pointed downwardly (as shown in FIG. 8) or upwardly (not shown) depending upon the direction of flow through the valve 40. Thus, the opening of the C-ring seal 101 is substantially parallel to the axis of travel of the valve stem 94. If fluid flow is from the port 42 to the port 43, the C-ring seal 101 is oriented with its opening pointed downward as shown in FIG. 8 in order to provide a fluid tight seal at shut off. The seal retainer 102 is suitably attached, such as by threads, to the valve stem 94 and is arranged for retaining the C-ring seal 101 within the groove 98 of the valve plug 92. The seal retainer 102 has a retainer perimeter 103 which is substantially commensurate with the second cage perimeter 99, and the seal retainer 102 has a conventional piston ring 104. When the valve plug 92 is positioned against the lower valve seat 93 at shut off, any fluid attempting to leak through the valve 40 between the valve plug 92 and the valve cage 90 will fill the C-ring seal 101. This fluid will tend to press the C-ring seal 101 more tightly against both the upper valve seat formed by the slope i00 of the cage 90 and the second plug perimeter 97 to increase the seal between the valve plug 92 and the cage 90. Again, as noted above, the C-ring seal 101 is in compression only when the valve plug 92 is in its closed position. As a result, wear on the C-ring seal 101 and on the upper valve seat 100 is minimized or prevented. Also, the mechanical spring force of this seal compensates for the machining tolerances and dimensional variations caused by temperature changes.

Openings 105 are provided in the valve plug 92 to equalize the pressures in volume 106 above the valve plug 92 and volume 107 below the valve plug 92. Thus, because of the openings 105, the pressures in the volume 106 above the valve plug 92 and in the volume 107 below the valve plug 92 will be equal and, but for the unbalance area across the valve plug 92, would result in generally equal but opposite forces being applied to the valve plug 92. This unbalance area can best be seen from FIG. 8A.

Figure 8A:
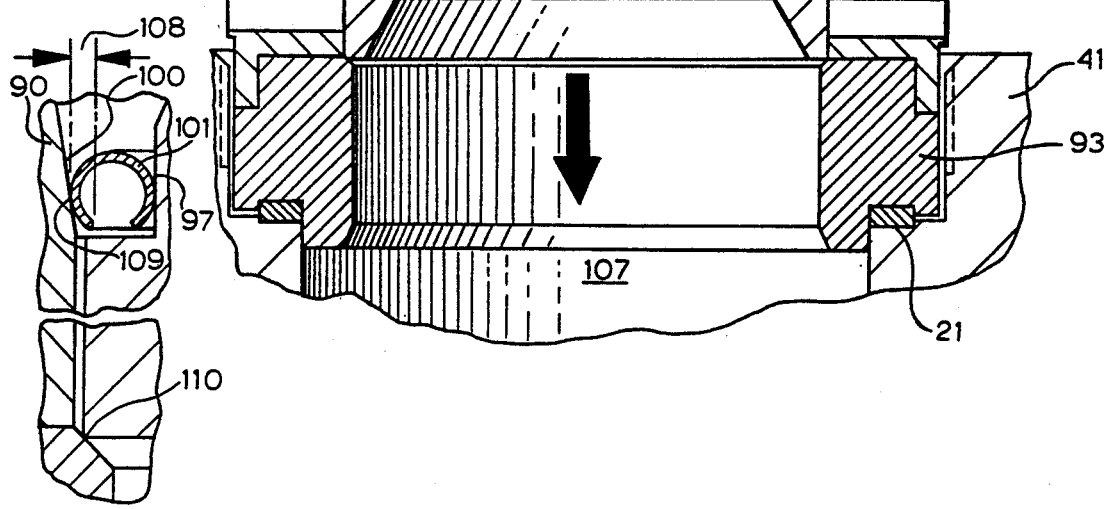

FIG. 8A is an enlarged cross-sectional view of that part of the trim arrangement shown in FIG. 8 which includes the C-ring seal 101, the upper valve seat formed by the slope 100, and the lower valve seat 93. The retainer 102 has been omitted from FIG. 8A for clarity. Also for clarity, the dimensions of the trim arrangement have been exaggerated. As shown in FIG. 8A, when the valve 40 is closed, the lower portion of the valve plug 92 seats against the lower valve seat 93 at point 110 and the C-ring seal 101 is pressed against the upper valve seat formed by the slope 100 at point 109. Because of the openings 105 through the valve plug 92, the outlet pressure is applied against both the upper and lower sides of the valve plug 92/retainer 102 combination. Since the pressures in the volumes 106 and 107 are thus equal, these pressures will exert generally equal but opposite forces on the valve plug 92. These generally equal but opposite forces will offset one another. However, the valve plug 92 will have an annular unbalance area 108 which will be exposed to different pressures resulting in non-offsetting forces being applied to the valve plug 92.

This unbalance area 108 of the valve plug 92 is annular and has an outer radius defined by the point 109 at which the C-ring seal 101 contacts the upper valve seat formed by the slope 100 and an inner radius defined by the point 110 at which the lower portion of the valve plug 92 contacts the lower valve seat 93. The lower side of this unbalance area 108 is exposed to inlet pressure because of the leakage between the valve plug 92 and the cage 90 which will fill the C-ring seal 101. The upper side of this unbalance area (i.e. at the top of the retainer 102) is exposed to the outlet pressure in the volume 106. If these pressures are different, as they will most often be, a resulting net force will be applied to the valve plug 92 which must be overcome by the valve actuator when the valve is to be closed. Because the slope 100 can be made slight, this unbalance area 108 is smaller than is the unbalance area 69 of the trim arrangement shown in FIG. 3. Thus, there is a smaller net force applied to the valve plug 92 of FIG. 8 than is applied to the valve plug 47 of FIG. 3 requiring a still smaller actuator to close the valve. Furthermore, the same C-ring can be used in the trim arrangement shown in FIG. 8 regardless of the flow direction through the valve which is not the case of the trim arrangement of FIG. 3. (That is, if the flow direction shown in FIG. 8 is reversed, the C-ring 101 is simply flipped over so that its opening now points up.)

The arrangement of FIG. 8 also allows Leakage Class V shut off when the valve plug 92 is positioned against the lower valve seat 93. Furthermore, the C-ring 101 may also be made of a suitable metal, such as Inconel X750 or 718, so that valve 40 can withstand high temperatures, such as those in the neighborhood of 450° F. (about 232° C.) and above.

Again, as noted above, it is apparent that the C-ring seal 101 is in compression only when the valve plug 92 is in its closed position. As a result, wear on the C-ring seal 101 and on the upper valve seat formed by the slope 100 is minimized. Furthermore, the mechanical spring force of the C-ring seal 101 compensates for the machining tolerances and dimensional variations caused by temperature changes.

Many embodiments, modifications and variations of the present invention have been shown herein and many more are possible in light of the above teachings. Therefore, it is to be understood that the invention may be practiced otherwise than as specifically described.

It is claimed is:

1. A valve comprising:
   a valve body having inlet and outlet ports;
   a valve stem extending through said valve body; and,
   trim means for controlling the flow of fluid between said inlet and outlet ports, said trim means including (a) a first valve seat, (b) valve plug means, attached to said valve stem, for preventing fluid flow between said inlet and outlet ports when said valve plug means is positioned by said valve stem against said first valve seat and allowing fluid flow between said inlet and outlet ports when said valve plug means is positioned by said valve stem away from said first valve seat, said valve plug means having opening means therethrough for equalizing pressure across said valve plug means when said valve plug means is positioned against said first valve seat, said valve plug means further having first and second plug perimeters forming a plug ledge, said plug ledge acting as a second valve seat, (c) seal means around said valve plug means for providing a seal to prevent fluid leakage through said valve, wherein said seal means is arranged to provide a mechanical spring force only when said valve plug means is positioned approximate to or against said first valve seat, (d) a valve cage having a first cage perimeter substantially commensurate with said first plug perimeter and a second cage perimeter substantially commensurate with said second plug perimeter, said first and second cage perimeters forming a cage ledge, and (e) retainer means for retaining said seal means substantially at said cage ledge such that, when said valve is closed, said seal means is seated against said second valve seat.

2. The valve according to claim 1 wherein said seal means comprises a C-ring surrounding said valve plug means and having a C-ring opening so that fluid leaking around said valve plug means will enter said C-ring opening so as to increase said seal against said leakage through said valve.

3. The valve according to claim 1 wherein said seal means comprises a V-ring surrounding said valve plug means and having a V-ring opening so that fluid leaking around said valve plug means will enter said V-ring opening so as to increase said seal against said leakage through said valve.

4. The valve according to claim 1 wherein said seal means comprises an S-ring surrounding said valve plug means, said S-ring being arranged so that fluid leaking around said valve plug means will increase said seal against said leakage through said valve.

5. A valve comprising:
   a valve body having inlet and outlet ports;
   a valve stem extending through said valve body; and,
   trim means for controlling the flow of fluid between said inlet and outlet ports, said trim means including (a) a first valve seat, (b) valve plug means, attached to said valve stem for preventing fluid flow between said inlet and outlet ports when said valve plug means is positioned by said valve stem against said first valve seat and allowing fluid flow between said inlet and outlet ports when said valve plug means is positioned by said valve stem away from said first valve seat, said valve plug means having opening means therethrough for equalizing pressure across said valve plug means when said valve plug means is positioned against said first valve seat, said valve plug means having first and second plug perimeters forming a plug ledge, (c) seal means around said valve plug means for providing a seal to prevent fluid leakage through said valve, wherein said seal means is arranged to provide a mechanical spring force only when said valve plug means is positioned approximate to or against said first valve seat, (d) a valve cage having a first cage perimeter substantially commensurate with said first plug perimeter and a second cage perimeter substantially commensurate with said second plug perimeter, said first and second cage perimeters forming a cage ledge, said cage ledge acting as a second valve seat, and (e) retainer means for retaining said seal means substantially at said plug ledge such that, when said valve is closed, said seal means is seated against said second valve seat.

6. The valve according to claim 5 wherein said seal means comprises a C-ring surrounding said valve plug means and having a C-ring opening pointing radially outward so that fluid leaking around said valve plug means will enter said C-ring opening so as to increase said seal against said leakage through said valve.

7. The valve according to claim 5 wherein said seal means comprises a V-ring surrounding said valve plug means and having a V-ring opening pointing radially outward so that fluid leaking around said valve plug means will enter said V-ring opening so as to increase said seal against said leakage through said valve.

8. The valve according to claim 1 wherein said valve plug means has first, second and third plug perimeters forming a recess such that said recess retains said seal means therein.

9. The valve according to claim 8 wherein said seal means comprises a C-ring surrounding said valve plug means and having a C-ring opening so that fluid leaking around said valve plug means will enter said C-ring opening so as to increase said seal against said leakage through said valve.

10. The valve according to claim 8 wherein said seal means comprises a V-ring surrounding said valve plug means and having a V-ring opening so that fluid leaking around said valve plug means will enter said V-ring opening so as to increase said seal against said leakage through said valve.

11. A valve comprising:
    a valve body having inlet and outlet ports;
    a valve stem extending through said valve body; and,
    trim means for controlling the flow of fluid between said inlet and outlet ports, said trim means including (a) a valve cage having a cage opening therein, (b) a lower valve seat, (c) a valve plug attached to said valve stem, said valve plug preventing fluid flow between said inlet and outlet ports through said cage opening when said valve plug is positioned by said valve stem against said lower valve seat and for allowing fluid flow between said inlet and outlet ports through said cage opening when said valve plug is positioned by said valve stem away from said lower valve seat, said valve plug having an opening therethrough for equalizing pressure across said valve plug when said valve plug is positioned against said valve seat, (d) an upper valve seat formed by one of said valve plug and said valve cage, and (e) seal means for providing a seal against leakage between said valve plug and said valve cage, wherein said seal means is arranged to provide a mechanical spring force only when said valve plug is positioned approximate to or against said lower valve seat.

12. The valve according to claim 11 wherein said seal means comprises a material capable of allowing said valve to be operated at temperatures of about 450° F. (about 232° C.) or higher.

13. The valve according to claim 12 wherein said material comprises a metal.

14. The valve according to claim 12 wherein said metal comprises a metal C-ring having a C-ring opening so that fluid leaking between said valve plug and said valve cage will enter said C-ring opening so as to increase said seal against said leakage through said valve.

15. The valve according to claim 13 wherein said metal comprises a V-ring having a V-ring opening so that fluid leaking between said valve plug and said valve cage will enter said V-ring opening so as to increase said seal against said leakage through said valve.

16. The valve according to claim 15 wherein said metal comprises an S-ring, said S-ring being arranged so that fluid leaking between said valve plug and said valve cage will increase said seal against said leakage through said valve.

17. A valve comprising:
a valve body having inlet and outlet ports;
a valve stem extending through said valve body; and,
trim means for controlling the flow of fluid between said inlet and outlet ports, said trim means including (a) a valve cage having outer and inner surfaces, said inner surface having a slope forming an upper valve seat, (b) a lower valve seat, (c) valve plug means, attached to said valve stem, for preventing fluid flow between said inlet and outlet ports when said valve plug means is positioned by said valve stem against said lower valve seat and for allowing fluid flow between said inlet and outlet ports when said valve plug means is positioned by said valve stem away from said lower valve seat, said valve plug means having an opening therethrough for equalizing pressure across said valve plug means when said valve plug means is positioned against said lower valve seat, and (d) seal means for providing a seal against leakage between said valve plug means and said valve cage wherein said seal means cooperates with said upper valve seat to prevent said leakage through said valve when said valve plug means is positioned against said lower valve seat and wherein said seal means is arranged to provide a mechanical spring force only when said valve plug means is positioned approximate to or against said lower valve seat.

18. The valve according to claim 17 wherein said seal means comprises a ring having a ring opening so that fluid leaking between said valve plug means and said valve cage will enter said ring opening and press said ring against said upper valve seat to increase said seal against said leakage through said valve when said valve plug means is positioned against said lower valve seat.

19. The valve according to claim 18 wherein said valve plug means is moved by said valve stem along an axis and wherein said ring opening is pointed in a direction substantially parallel to said axis.

20. The valve according to claim 19 wherein said trim means further comprises retainer means for retaining said ring to said valve plug means.

21. The valve according to claim 17 wherein said trim means further comprises retainer means for retaining said seal means to said valve plug means.

22. A valve comprising:
a valve body having inlet and outlet ports;
a valve stem extending through said valve body; and,
trim means for controlling the flow of fluid between said inlet and outlet ports, said trim means including (a) a valve seat, (b) valve plug means, attached to said valve stem, for preventing fluid flow between said inlet and outlet ports when said valve plug means is positioned by said valve stem against said valve seat and allowing said fluid flow between said inlet and outlet ports when said valve plug means is positioned by said valve stem away from said valve seat, said valve plug means having opening means therethrough for equalizing pressure across said valve plug means when said valve plug means is positioned against said valve seat, and (c) a seal ring surrounding said valve plug means for providing a seal to prevent fluid leakage through said valve, said seal ring having a ring opening pointing in a direction substantially parallel to said valve stem such that fluid leaking through said valve enters said seal ring through said seal ring opening, said seal ring being arranged to provide a mechanical spring force only when said valve plug means is positioned approximate to or against said valve seat.

* * * * *

UNITED STATES PATENT AND TRADEMARK OFFICE
CERTIFICATE OF CORRECTION

PATENT NO. : 5,236,014
DATED : August 17, 1993
INVENTOR(S) : MELVIN L. BULS, et al.

It is certified that error appears in the above-indentified patent and that said Letters Patent is hereby corrected as shown below:

Col. 5, line 17, "t o" should be --to--.

Col. 5, line 18, "bolts" should be --studs--.

Col. 6, line 64, "passed" should be --past--.

Col. 6, line 64, "are" should be --area--.

In Figure 3, reference numeral "49" (to the right of arrow 44) should be --47--.

Signed and Sealed this

Fifth Day of April, 1994

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,236,014
DATED : August 17, 1993
INVENTOR(S) : Melvin L. Buls and Randy J. Hall It is certified that error appears in the above-indentified patent and that said Letters Patent is hereby corrected as shown below:

On title page, item [75]
        change "Randy L. Hall" to --Randy J. Hall--.

Signed and Sealed this

Third Day of May, 1994

*Attest:*

BRUCE LEHMAN

*Attesting Officer*     *Commissioner of Patents and Trademarks*